(12) United States Patent
Siddu et al.

(10) Patent No.: US 8,090,178 B2
(45) Date of Patent: Jan. 3, 2012

(54) SYSTEM AND METHOD FOR AUTOMATIC DETECTION OF INTERNAL STRUCTURES IN MEDICAL IMAGES

(75) Inventors: Dinesh Mysore Siddu, Bangalore (IN); Mausumi Acharyya, Bangalore (IN); Jonathan Stoeckel, RB Hierden (NL)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1182 days.

(21) Appl. No.: 11/694,050

(22) Filed: Mar. 30, 2007

(65) Prior Publication Data

US 2007/0248254 A1  Oct. 25, 2007

Related U.S. Application Data

(60) Provisional application No. 60/789,904, filed on Apr. 6, 2006, provisional application No. 60/789,959, filed on Apr. 6, 2006.

(51) Int. Cl.
*G06K 9/00* (2006.01)
(52) U.S. Cl. ........ 382/131; 382/128; 382/129; 382/130; 382/132; 382/152
(58) Field of Classification Search .......... 382/128–132; 378/4; 600/425
See application file for complete search history.

(56) References Cited

U.S. PATENT DOCUMENTS

| | | | | |
|---|---|---|---|---|
| 2004/0096096 | A1* | 5/2004 | Huber | 382/152 |
| 2004/0101184 | A1* | 5/2004 | Sivaramakrishna et al. | 382/131 |
| 2005/0107691 | A1* | 5/2005 | Zalis | 600/425 |
| 2005/0169529 | A1* | 8/2005 | Owechko et al. | 382/190 |
| 2005/0276468 | A1 | 12/2005 | Ying et al. | |

OTHER PUBLICATIONS

Lee et al. "Recognizing abdominal organs in CT images using contextual neural network and fuzzy rules", Engineering in Medicine and Biology Society, 2000, Proceedings of the 22nd Annual International Conference of the IEEE, Jul. 23-28, 2000, Piscataway, NJ, vol. 3, Jul. 23, 2000, pp. 1745-1748.

Tetsuya et al., "Visualization & Selection of Target Regio in Diagnosis of Medical Images", J-East-Proceedings of the Virtual Realty Society of Japan Annual Conference, vol. 10th, 2005, pp. 2B1-1, retrieved from internet: http://sciencelinks.jp/j-east/display.php?id=000020052305A0880914.

Florin et al., "Automatic heart peripheral vessels segmentation based on a normal MIP ray casting technique", Lecture Notes in Computer Science, Springer Verlag, Berlin, DE, vol. 1, Jan. 2004, pp. 483-490.

(Continued)

*Primary Examiner* — Vu Le
*Assistant Examiner* — Amara Abdi
(74) *Attorney, Agent, or Firm* — Peter Withstandley

(57) ABSTRACT

A medical imaging system is used to recognize an internal structure from a three-dimensional image. The image includes image sub-volumes. An image sub-volume is selected using a non-linear search pattern. The selected image sub-volume is analyzed for the presence of the internal structure. The steps of selecting an image sub-volume using the non-linear search pattern and analyzing the selected sub-volume for the presence of the internal structure are repeated until the internal structure is found in an image sub-volume. Bounds of the internal structure are identified based on the location of the image sub-volume within which the internal structure is found.

18 Claims, 7 Drawing Sheets

OTHER PUBLICATIONS

Mori et al., "Recognition of bronchus in three-dimensional X-ray CT images with applications to virtualized bronchoscopy system", Proceedings of the 13th International Conference on Pattern Recognition, IEEE Comput. Soc. Press, Los Alamitos, CA, vol. 3, 1996, pp. 528-532.

Ukai et al., "An algorithm for coronary calcification diagnosis based on helical CT images", Proceedings of the 13th International Conference on Pattern Recognition, IEEE Comput. Soc. Press, Los Alamitos, CA, vol. 3, 1996, pp. 543-547.

* cited by examiner

SYSTEM AND METHOD FOR AUTOMATIC DETECTION OF INTERNAL STRUCTURES IN MEDICAL IMAGES

CROSS-REFERENCE TO RELATED APPLICATION

The present application is based on U.S. Provisional Application Ser. No. 60/789,904, filed Apr. 6, 2006 and U.S. Provisional Application Ser. No. 60/789,959, filed Apr. 6, 2006, the entire contents of which are herein incorporated by reference.

BACKGROUND OF THE INVENTION

1. Technical Field

The present disclosure relates to medical images and, more specifically, to a system and method for automatic detection of internal structures in medical images.

2. Discussion of the Related Art

Modern radiological medical imaging devices such as multi-slice computerized tomography (CT) scanners, magnetic resonance imaging (MRI) scanners, medical ultra-sonography scanners, positron emission tomography (PET) scanners and the like may be used to quickly and easily generate detailed images of a subject's body. Due to the availability of such imaging devices and their usefulness, medical imaging has become an important part of patient care.

While medical imaging scanners may be able to generate a large amount of images, a healthcare professional, such as a radiologist, must carefully consider each image in order to render a diagnosis. With the increased reliance on medical imagery and increased emphasis on the control of medical expenses, methods for computer aided diagnosis (CAD) of medical images have been developed. Approaches to CAD have focused on processing medical images to determine regions of suspicion. Radiologists may then be able to pay particular attention to the regions of suspicion and thus increase diagnostic accuracy while reducing the time required to form the diagnosis.

In order to perform CAD, it is first necessary to identify the various internal structures that are present in the image. In this step, regions or objects of interest are identified and characterized. This step is known as segmentation. Because medical images may vary widely from one another in terms of pixel density and image scope, it may be difficult for a computer to perform automatic segmentation on a medical image. Accordingly, many approaches to segmentation are semi-automatic. In semi-automatic segmentation, user input is required before the computer may accomplish segmentation.

In some forms of semi-automatic segmentation, a user must manually identify an internal structure of interest and pass this information onto the computer. For example, the user may input a seed point indicating a location that is within the internal structure of interest. The user may also identify the type of internal structure that is of interest. The computer may then use this seed point and structure identity to identify the bounds of the internal structure of interest.

Approaches to semi-automatic segmentation often vary according to the identity of the structure of interest. For example, segmentation of the lungs may be performed differently than segmentation of the colon. For this reason, different tools are often used to perform segmentation on different internal structures, and thus conventional segmentation tools often lack the versatility to perform segmentation on more than one internal structure.

Moreover, existing segmentation tools may be highly susceptible to imaging artifacts such as noise, motion and partial volume. Such artifacts may prevent accurate segmentation. Segmentation tools that are robust enough to handle one form of artifact are often susceptible to another form of artifact. For example, a tool that is robust against noise may be particularly susceptible to volume effects.

For these reasons, segmentation tools that are general enough to perform segmentation on a wide range of medical images and internal structures tend to provide unacceptable results. Other segmentation tools may provide acceptable results but may only be used for a very specialized set of medical images and internal structures. Accordingly, many varying approaches to segmentation may be performed in sequence to provide acceptable results. This practice can be complicated and time consuming.

SUMMARY

A medical imaging system is used to recognize an internal structure from a three-dimensional image. The image includes image sub-volumes. An image sub-volume is selected using a non-linear search pattern. The selected image sub-volume is analyzed for the presence of the internal structure. The steps of selecting an image sub-volume using the non-linear search pattern and analyzing the selected sub-volume for the presence of the internal structure are repeated until the internal structure is found in an image sub-volume. Bounds of the internal structure are identified based on the location of the image sub-volume within which the internal structure is found.

The medical imaging system may be a computer tomography (CT) system or a magnetic resonance imaging (MRI) system. The sub-volumes may be image slices. The non-linear search pattern may be a non-linear list search pattern. The non-linear search pattern may be a binary search pattern. The internal structure may be a colon, a lung or a heart. The three-dimensional image may be analyzed within the identified bounds of the internal structure to determine whether a contrast is present within the internal structure. When it is determined that contrast is present, it may be determined whether the internal structure has an elevated risk of irregularity based on the contrast. The step of determining whether a contrast is present within the internal structure may include identifying a middle sub-volume of the internal structure based on the identified bounds, identifying a region of interest within the internal structure, detecting voxels with contrast within the region of interest by applying a predetermined threshold, performing connected components labeling to define a region of contrast, computing an area of defined region of contrast, comparing an area of defined region of contrast against a minimum size criteria and determining contrast is present within the internal structure when the defined area of contrast is greater than the minimum size criteria. The three-dimensional image may be analyzed within the identified bounds of the internal structure to determine whether the internal structure has an elevated risk of irregularity. The elevated risk of irregularity may be a suspected emboli or cancer. The step of analyzing the selected image sub-volume for the presence of the internal structure may include performing a 3D to 2D transformation on the selected image sub-volume by extracting opacity values along rays on the image sub-volume plane, processing the rays by discarding opacity values greater than a fixed value, and computing the means of all opacity values along each ray. A 1D profile may be generated on the selected image sub-volume by performing Gaussian smoothing and calculating column-wise average of the 2D transformation. The 1D profile may be analyzed against known 1D profiles of possible internal structures to determine the presence of the internal structure within the image sub-volume.

A method for determining whether a contrast is present within an internal structure identified from a three-dimensional image including image sub-volumes includes identifying a middle sub-volume of the internal structure based on identified bounds of the internal structure. A region of interest within the internal structure is identified. Voxels with contrast are detected within the region of interest by applying a predetermined threshold. Connected components labeling is performed to define a region of contrast. An area of defined region of contrast is computed. The area of defined region of contrast is compared against a minimum size criteria. It is determined whether contrast is present within the internal structure when the defined area of contrast is greater than the minimum size criteria.

The internal structure may be a heart, lung or colon. It may be determined whether the internal structure has an elevated risk of irregularity based on the contrast. The elevated risk of irregularity may be a suspected emboli or cancer.

A computer system includes a processor and a program storage device readable by the computer system. The program storage device embodies a program of instructions executable by the processor to perform method steps for recognizing an internal structure from a three-dimensional image including image sub-volumes. An image sub-volume including cross section of the internal structure is searched for using a non-linear search pattern. Bounds of the internal structure are identified based on the location of the image sub-volume within which the internal structure is found.

The non-linear search pattern may be a binary search pattern. The three-dimensional image may be analyzed within the identified bounds of the internal structure to determine whether the internal structure has an elevated risk of irregularity. The three-dimensional image may be analyzed within the identified bounds of the internal structure to determine whether a contrast is present within the internal structure. The image sub-volumes may be image slices.

A medical imaging system recognizes an internal structure from a three-dimensional image including image sub-volumes. A selecting unit selects an image sub-volume of the plurality of image sub-volumes using a non-linear search pattern. An analyzing unit analyzes the selected image sub-volume for the presence of the internal structure. The selecting unit and the analyzing unit repeat the selecting of an image sub-volume and analyzing the image volume until the internal structure is found in an image sub-volume. An identification unit identifies bounds of the internal structure based on the location of the image sub-volume within which the internal structure is found.

A computer tomography (CT) system or a magnetic resonance imaging (MRI) system may be used for acquiring the plurality of image sub-volumes. The sub-volumes may be image slices. The non-linear search pattern may be a non-linear list search pattern or a binary search pattern. A contrast-detection unit may analyze the three-dimensional image within the identified bounds of the internal structure to determine whether a contrast is present within the internal structure. An automatic detection unit may analyze the three-dimensional image within the identified bounds of the internal structure to determine whether the internal structure has an elevated risk of irregularity.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF THE DRAWINGS

Figure 1:
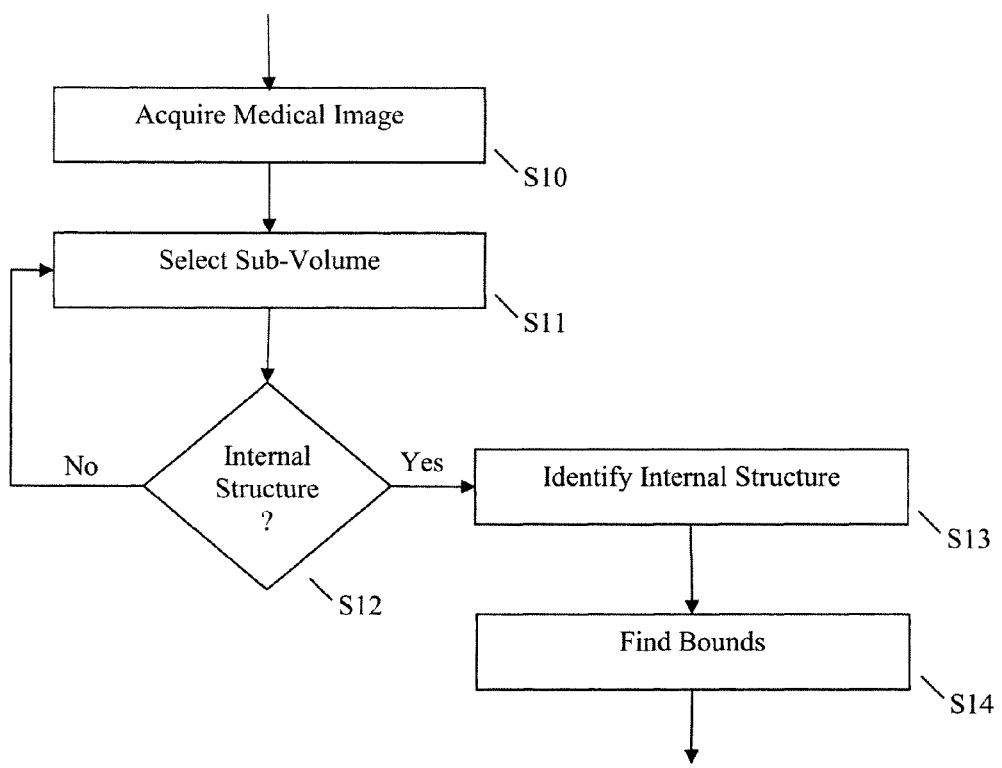
FIG. 1 is a flow chart illustrating a method for identifying an internal structure according to an exemplary embodiment of the present invention.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide segmentation of medical images without the need for manual intervention. Moreover, segmentation may be effective for a large number of diverse medical images. Automatic segmentation may then allow for an approach to fully-automatic CAD for a wide variety of medical images and internal structures.

Internal Structure Identification

As CAD tools tend to be internal-structure specific, it is beneficial to begin by locating discrete regions within a medical image and identifying the internal structures that correspond to the located regions. FIG. 1 is a flow chart illustrating a method for identifying an internal structure according to an exemplary embodiment of the present invention. A medical image may be acquired (Step S10). Acquisition of the medical image may be in the form of scanning a patient with a medical imaging device or a pre-existing medical image may be recalled, for example, by retrieval from a Digital Imaging and Communications in Medicine (DICOM) compatible database of medical images.

The medical image may be, for example a 3D CT volume image made up of a series of sub-volumes such as slices. One or more slices may be selected, for example, according to a sub-volume selection approach discussed below (Step S11). Each selected sub-volume may be processed to determine if an internal structure is present within the slice (Step S12). To make this determination, an internal structure determination application may be used. Such applications are well known in the art. If there is an internal structure present in the slice (Yes, Step S12), then the slice may be further processed to identify the internal structure (Step S13). To make this determination, an internal structure identification application may be used. Such applications are well known in the art. However, if there is no internal structure present in the slice (No, Step S12), then the next slice may be selected (Step S11) and the remainder of the process repeated.

After the internal structure has been identified (Step S13), the bounds of the internal structure may be found (Step S14), for example by examining nearby image slices. To make this finding, internal structure bounding applications may be used. Such applications are well known in the art.

Figure 2:
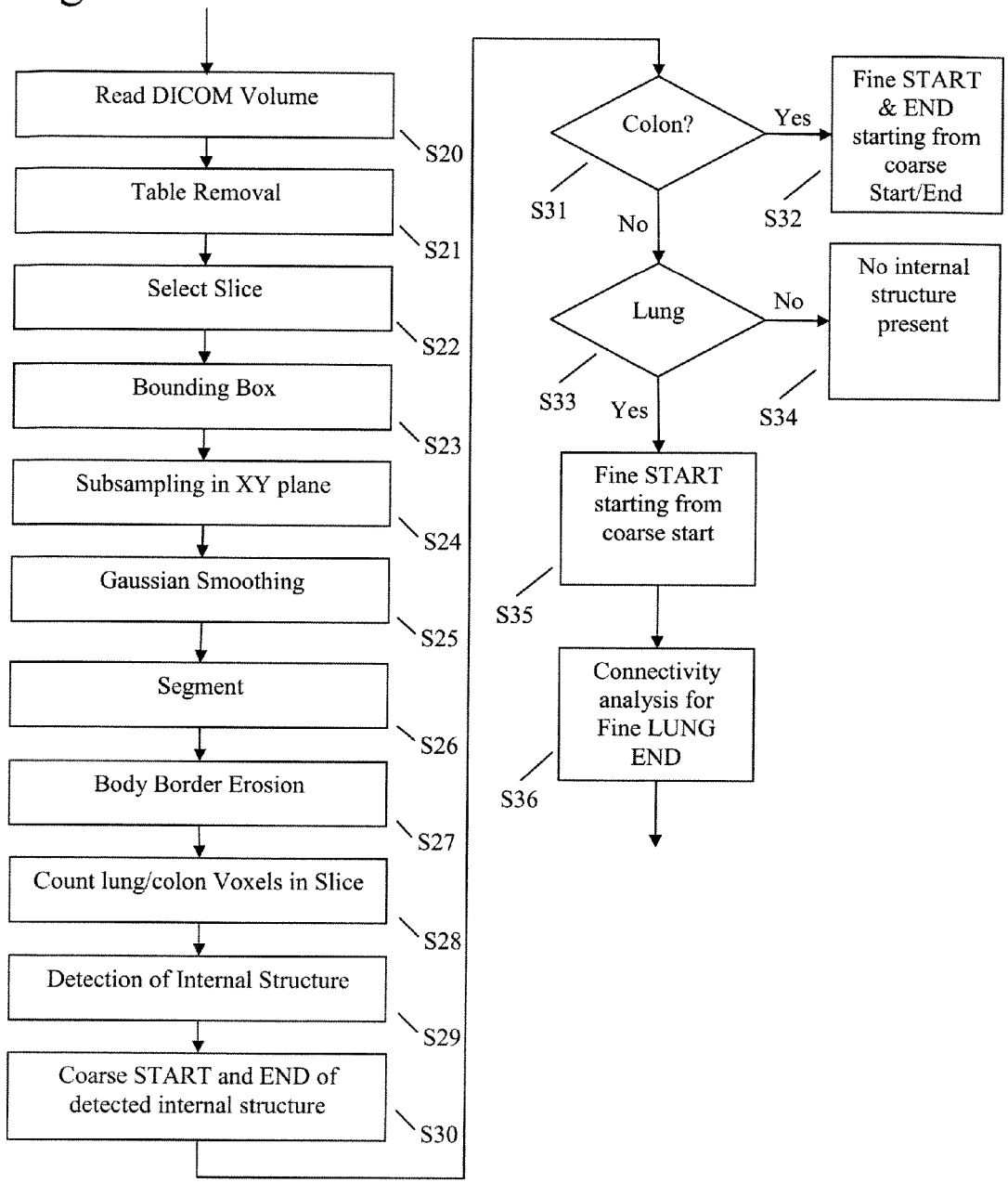
FIG. 2 is a flow chart shown a detailed example of the method shown in FIG. 1.

FIG. 2 is a flow chart shown a detailed example of the method shown in FIG. 1. First, a medical image may be acquired, for example, by retrieving a medical image from a database of DICOM images (Step S20). The DICOM acquired medical image may be a volume image comprised of a plurality of sub-volumes. Each sub-volume may be a volume slice. The medical image may be retrieved slice-by-slice. The slices may be arranged into a 3D array based on DICOM header information.

After the image is acquired, the image slices may be pre-processed. For example, patient table removal may be performed on the image slices (Step S21). As medical imaging scans are generally performed when the patient is lying on a table, an image of the table is often incorporated into the medical image. Patient table removal is the process of removing the image of the table from the medical image. Similarly, preprocessing may be used to remove other imaging accessories from the medical image.

Preprocessing may include identifying the patient's body and generating a mask to distinguish the patient's body from any surrounding objects. The mask is a graphical overlay that identifies each voxel belonging to the patient's body with a value of "1" and identifies each voxel not belonging to the patient's body with a value of "0." The mask may then be used to replace all voxels not belonging to the patient's body with a set value. For example, these voxels may be replaced with a value of $2^{13}$ for reasons discussed below.

An image slice is then selected (Step S22). Methods for slice selection are described in detail below. Additional preprocessing may be performed on the selected slice to further remove irrelevant data. For example, the boundaries of the body may be further defined and redundant portions outside the body may be removed from the image. For example, a box delineating the bounds of the body may be generated (Step S23). Preprocessing may also include sub-sampling the image slice in the X and Y planes (Step S24). Sub-sampling is a process of reducing the resolution of the image slice, for example, by removing every other voxel in both the X-axis direction and the Y-axis direction. By reducing the slice resolution, image processing may be less intensive and computational time may be reduced.

The image slice may then be smoothed by the application of a Gaussian filter (Step S25). Smoothing may reduce intensity inhomogeneities and correct for image quality degradation caused by sensitivity to noise and low x-ray dose image acquisition.

Segmentation may then be performed on the slice (Step S26). During segmentation, statistical analysis may be used to identify each voxel as belonging to one of a number of available classes. Examples of available classes may include a "Label 0" indicating a background region beyond the patient's body, "Label 1" indicating a volume of air or colon, "Label 2" indicating lung, "Label 3" indicating soft tissue, and "Label 4" indicating contrast. Other labels may also be possible, and the above labels are offered as an example.

In performing segmentation, soft tissue regions may be identified based on a global histogram of the region of the patient's body. Soft tissue may then be distinguished from organs such as the lungs and colon using a grey-level thresholding process.

Thresholding is an example of a segmentation technique. Thresholding is a spatial domain method that operates directly on the image pixel, scanning them one-by-one. Where the grey-level image is represented as the pixel intensity function $f(x,y)$, the threshold value is T and the point $(x,y)$ is a pixel position, the expression for the output image $g(x,y)$ can be written:

$$g(x, y) = \begin{cases} 1, & \text{if } f(x, y) > T \\ 0, & \text{if } f(x, y) < T \end{cases} \quad (1)$$

where pixels labeled 1 are object points and pixels labeled 0 are background points.

The thresholding technique described above is offered for example, and it is to be understood that multiple thresholds may be used. Where multiple thresholds are used, each pixel may be assigned to a threshold based on its intensity. This technique is known as multi-thresholding.

For example, multiple thresholds may be defined and may be named $T_1$, $T_2$, $T_3$, and $T_4$ to differentiate between distinct internal structures. For example, it may be observed that a prepared colon, filled with air, may appear with an intensity within the range of approximately 0 and 90. Lung tissue may appear with an intensity within the range of approximately 90 to 400. Soft tissue may appear with an intensity within the range of 400 to 1200. Regions with contrast may appear with an intensity within the range of 1700 to 4096.

A suitable threshold may be chosen through an iterative process. For example, colon voxels may be defined as (C) and lung voxels may be defined as (L). First, an initial threshold $T_1$ may be selected, for example, $T_{1,1}=90$. Then thresholding may be performed, for example, using equation (1) above. Then, the resulting labels may be used to compute average grey-level $\mu_C$ and $\mu_L$ for the voxels of the two groups. A new threshold value $T_{1,2}=50*(\mu_C+\mu_L)$. The above steps of performing thresholding and computing average grey levels may be repeated for n iterations until the difference between the threshold values in two following iterations is smaller than a predefined parameter $T_{1,n}$ (for example, where $T_{1,n}-1$).

In performing segmentation, there may be misclassifications at the boundary of the body. To correct for this, a few pixels, for example 5 pixels, may be eroded at the boundary of the body (Step S27). This process may be incorporated into the table removal algorithm. After this step, the internal structures present in the slice may be determined, for example, it may be determined how many, if any, lung or colon voxels are present in the slice (Step S28).

It may then be determined whether the selected slice belongs to an internal structure such as a lung or colon or if the slice does not show an internal structure being searched for (Step S29). For example, a slice may belong to a lung if there are more lung pixels than colon pixels in the slice and a slice may belong to a colon if there are more colon pixels than lung pixels in the slice. Where there are neither lung nor colon pixels, the slice may be determined to not show the internal structures being searched for.

Once a particular internal structure has been identified within a slice, the first and last slice of the internal structure are identified. First, a course start and end slice may be found (Step S30). The course start and end are approximate start and end slices that may be found more quickly than the exact start and end slices. The course start and end slices may be found, for example, by implementing one or more of the search techniques discussed below. However, the search techniques may use the identified slice as a starting position to more quickly find the course start and end.

The course start and end may then be used as staring points to locate the fine start and end slices. The fine start and end slices represent the more exact slices where the internal structure appears. Finding the fine start and end slices may best be performed based on the identity of the internal structure. Accordingly, it may be first determined whether the internal structure in question is a colon (Step S31). If it is a colon (Yes, Step S31) then the fine start and end slices are located for the colon based on the course start and end slices previously determined (Step S32). If it is not a colon (No, Step S31) then it is determined if it is a lung (Step S33). If it is not a lung (No, Step S33) then no desired internal structure is found (Step S34). If it is a lung (Yes, Step S33) then the fine start and end slices are located for the lung based on the course start and end slices previously determined (Step S35).

While the above example uses the colon and the lungs as the possible internal structures of interest, it is to be understood that any number internal structures may be considered. Accordingly, these techniques may easily be adapted for locating any internal organ or related internal structures.

As discussed above, the fine searches may be bodily structure specific. In searching for the fine start and end for the colon, it is assumed that the fine start is located within a search window of the course start and that the fine end is located within a search window of the course end. According to one technique for finding a fine start colon slice from a course start colon slice, three consecutive slices within the search window are identified, for example, the course start slice, the slice immediately prior to the course start slice and the slice immediately after the course start slice. A first derivative is calculated for a function representing all three slices. The first derivative accordingly represents the rate of change between the slices. The slice for which the derivative changes sign from positive to negative or negative to positive is considered to be the fine start slice of the colon.

After the fine start colon slice has been found, the fine end colon slice may be found. A constant $MAX_C$ is added to the fine start colon slice to identify a maximum slice that need be examined to locate the fine end slice. This constant $MAX_C$ represents a maximum size for the colon. Accordingly, the course colon end is calculated from the determined position of the fine colon start plus the MAXc value. The fine colon end may then be found based on the course colon end. Alternatively, the course colon end may be found using the same approach as was used to find the course colon start.

Search Patterns for Slice Selection

As discussed above, identifying slices containing desired internal structures may be calculation intensive and may require extended processing time. This may be particularly true where each slice is searched one after the other for the presence of the desired internal structures.

Alternative search approaches reduce processing time by examining every other slice or every third slice. Where the size of the internal structure is known, search approaches may be used that examine a slice at preset intervals where the interval is defined as being less than or equal to the size of the internal structure being searched for. For example, where the desired internal structure is a colon, it may be known that in an adult patient, the colon is always larger than 10 cm. Accordingly, a slice may be examined for the presence of the colon once every 10 cm.

Search techniques that involve examining every slice in order or examining a slice at regular intervals are referred to as linear search techniques because the search may be expressed as a linear equation. While linear search techniques are simple and methodical, searches tend to be slow and computationally intensive.

Accordingly, exemplary embodiments of the present invention provide non-linear search techniques for selecting slices to be examined for the presence of a desired internal structure. By employing non-linear search techniques, the amount of time and degree of computation needed to locate the desired internal structure within a 3D volume of slices may be reduced.

A binary search technique may be used as an approach for selecting the order in which sub-volumes, for example slices, are searched. Binary search techniques may be based on the binary search concept. The binary search concept searches a data set by beginning with a middle value. At that middle value it is determined whether the data being searched for is above the middle value or below the middle value. The range that does not contain the desired data is ruled out and the process reoccurs for the remaining range until the desired data is found. Accordingly, at each step, half of the data set may be ruled out until the desired data is found. In general, this approach may be significantly quicker than performing a linear search where every data point is searched one-by-one.

Exemplary embodiments of the present invention apply binary search techniques for the selection of sub-volumes. Accordingly, the desired internal structure may be found using binary search techniques more quickly than could otherwise be achieved using a linear search technique such as by searching each sub-volume from beginning to end.

According to one such approach, a function:

$$binarySearch(start,end,step,Arr,Value) \quad (2)$$

may be defined. Given a volume with N number of slices, the middle slice of the volume corresponds to:

$$mid=floor(end+start)/(step) \quad (3)$$

where start=1 is the first slice, end=N is the last slice, and step=2 in the first call of the function.

This search pattern may be used to identify the slices to process for determining whether the desired internal structure is present. If the internal structure is identified then no other slice need be processed. However, if the processed slice is not found, then the next slice may be selected.

In searching slices, a minimum search interval (minSearchInterval) may be used to avoid searching two slices too close to one another. This interval may be, for example, a value known to be less than the size of the internal structure being searched for. Accordingly, the search interval may be subdivided in each recursion such that:

$$(end+start)/step>minSearchInterval \quad (4)$$

Each sub-volume may be indexed prior to the search. By indexing each sub-volume, it may be possible to reject half of the data set at each iteration. Pseudocode for determining the index of a given value in an array between indices start and end is illustrated below:

function binarySearch(Start, End, Step, Arr, value)

```
if End < Start
    return not found
mid := floor ((start+end)/step)
if Arr[mid] = value
    return mid
if value < Arr[mid]
    binarySearch( start, mid, step, Arr, value)
else
    binarySearch( mid, end, step, Arr, value)
```

After a slice having the desired internal structure has been found, the binary search may be used to find the first and last slices containing the structure. For this, another search function may be used:

bodypartSearch(start,end,step,Arr,value)    (5)

To find the start slice, for example, in the range between 1 and mid:

bodypartStart=bodypartSearch(1,mid,2,Count,Thresh)    (6)

and:

bodypartEnd=bodypartSearch(mid,N,2,Count,Thresh)    (7)

After each iteration, a new mid is obtained according to equation (3) and the process continues recursively until the stopping criterion is reached. This process is repeated for the top half and then the bottom half.

Another example of a binary search pattern technique does not require that each sub-volume be indexed prior to the search. In this example, the binary search pattern is used to select the order in which sub-volumes are examined for the presence of the desired internal structure. Here, the middle sub-volume may be selected first. If the desired internal structure is not found in the middle sub-volume, then the search reoccurs within each half of the total volume. Therefore, the middle sub-volume is seen as delineating between a first set of sub-volumes to one side of the middle sub-volume and a second set of sub-volumes to the other side of the middle sub-volume. A new middle sub-volume is identified for each of the first and second set of sub-volumes and these middle sub-volumes are checked for the desired internal structure. If the desired internal structure is not found among either of these middle sub-volumes then the process continues recursively until the internal structure is found or until the space between the checked sub-volumes is below the predetermined minimum size of the desired internal structure, in which case, the search is terminated unsuccessfully.

The above-described binary search pattern is an example of a non-linear search pattern. A linear search pattern is an approach for selecting sub-volumes to be searched that either searches each sub-volume in order or searches one sub-volume at constant intervals, such as every 10th sub-volume. A non-linear search pattern is therefore a more complex form of search that cannot be defined by searching at constant intervals. Accordingly, the binary search pattern described above is an example of a non-linear search pattern.

Another example of a non-linear search pattern would be to check every nth sub-volume where n is a variable that changes according to the relative location within the 3D volume. For example, n may be every 5th sub-volume towards the center of the 3D volume and may gradually increase towards the ends of the 3D volume.

Other examples of non-linear search patterns are possible and may be based on patterns that are believed to check those locations most likely to contain the desired internal structure before checking locations less likely to contain the desired internal structure. Such patterns may be formed, for example, my analyzing empirical data collected during previous searches.

Contrast Detection and Structure Profiling

Exemplary embodiments of the present invention provide methods and systems for computer aided diagnosis (CAD) to detect and identify internal structures and regions of radiocontrast in medical images. Radiocontrast agents are radioopaque compounds used to improve visibility of internal structures in medical images such as x-rays and CT scans. MRI contrast agents may similarly be used to improve visibility of internal structures in medical images such as MRIs by altering magnetic properties in an observable way. As used herein, the term "contrast" includes all forms of radiocontrast agents, MRI contrast agents and any other detectable agent that may be administered to the patient prior to or during a medical imaging scan.

The use of contrast may be injected into bodily fluids and cavities so that volume and flow may be visualized. For this reason, contrast is often used for diagnosing such conditions as lung nodule detection, colon polyp detection, cardiovascular disease and pulmonary emboli.

Medical images that were scanned with the use of contrast may appear substantially different than medical images that were scanned without the use of contrast. Accordingly, different tools may be used to detect and identify internal structures in cases where contrast has been used than to detect and identify internal structures in cases where contrast has not been used. While such information may be associated with medical images, for example, in the form of DICOM header data, this information may be unreliable. Therefore, CAD applications may benefit from the ability to automatically determine whether contrast has been used.

Moreover, detection of body parts, body part position and the existence of contrast in volume may allow for better selection of CAD tools and may enhance the efficacy of CAD and reduce the processing time required. Therefore, the detection of contrast and the identification of internal structures are closely related.

In the disclosure below, examples of internal structure identification and contrast detection are described with reference to an example where the internal structure being searched for is the heart. However, it is to be understood that any internal structure may be searched for, and in some exemplary embodiments, more than one internal structure may be searched for.

Three-dimensional internal structures may be identified by calculating a one-dimensional profile based on the internal structure and comparing the one-dimensional profile against template profiles of known structures so that a match may be found.

Figure 3:
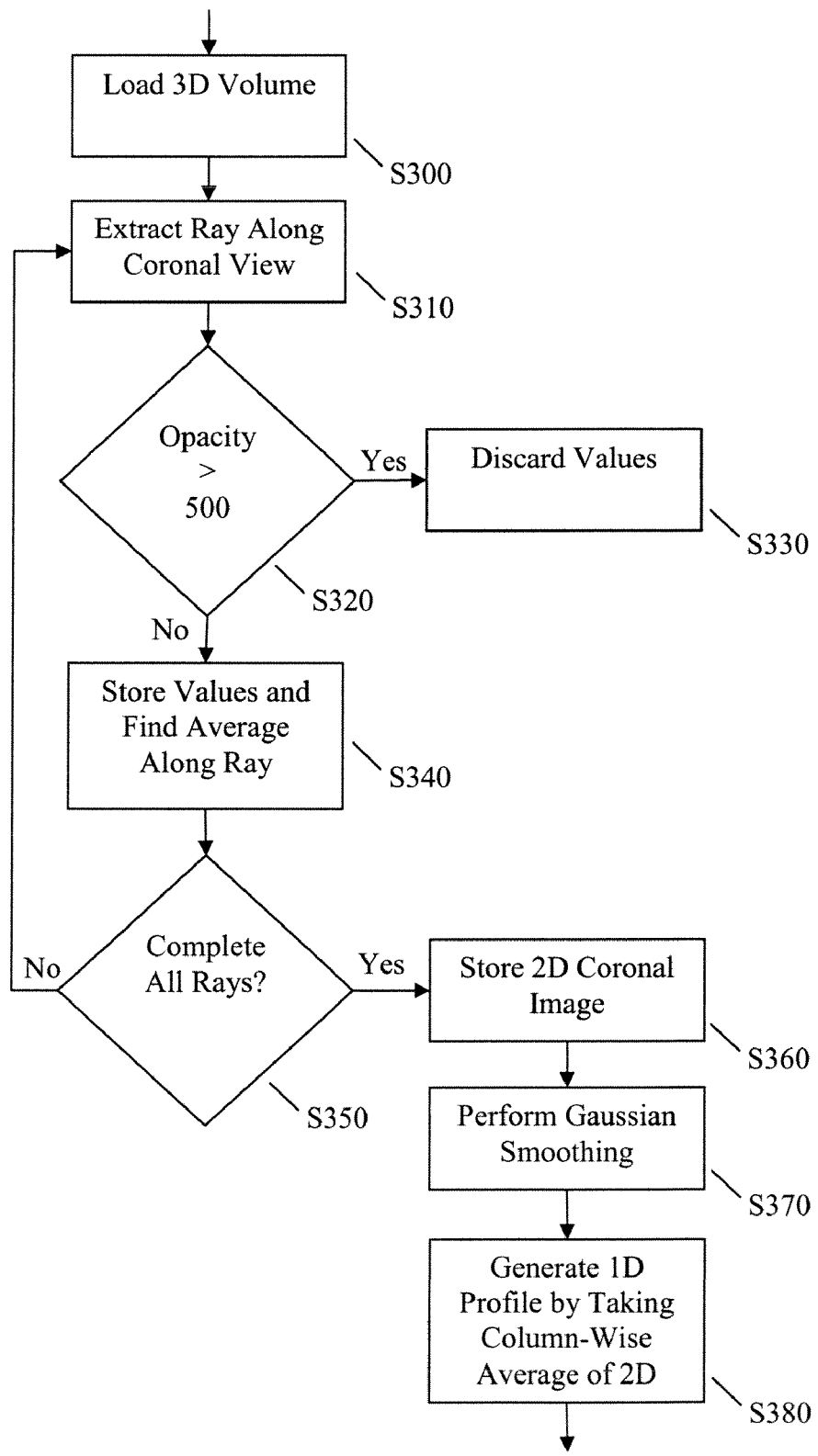
FIG. 3 is a flow chart illustrating a method for generating a 1D profile of a 3D image according to an exemplary embodiment of the present disclosure.

FIG. 3 is a flow chart illustrating a method for generating a 1D profile of a 3D image according to an exemplary embodiment of the present disclosure. First, the 3D image volume may be acquired (Step S300). Next, a ray along the coronal plane of the body may be calculated from the 3D image (Step S310). Opacity values above a predetermined threshold may be discarded to prevent non-essential data from influencing the profile. Accordingly, the opacity values of the ray are compared against a predetermined value, for example, it may be determined if the opacity values exceed 500 (Step S320). If they do (Yes, Step S320), then the values may be discarded (Step S330). If they do not (No, Step S320), then the values may be stored and an average value along the ray may be calculated (Step S340). The same process may be performed for all rays by determining whether all rays have been completed (Step S350). If not all rays have been completed (No, Step S350) then the next ray is extracted (Step S310). Otherwise (Yes, Step S350), the 2D coronal image is stored (Step S360). Gaussian smoothing may then be performed on the stored 2D coronal image (Step S370), for example, using a Gaussian filter of sigma 1 to remove spurious signals. Finally, a 1D profile may be formed by calculating a column-wise average of the 2D coronal image (Step S380).

Figure 4:
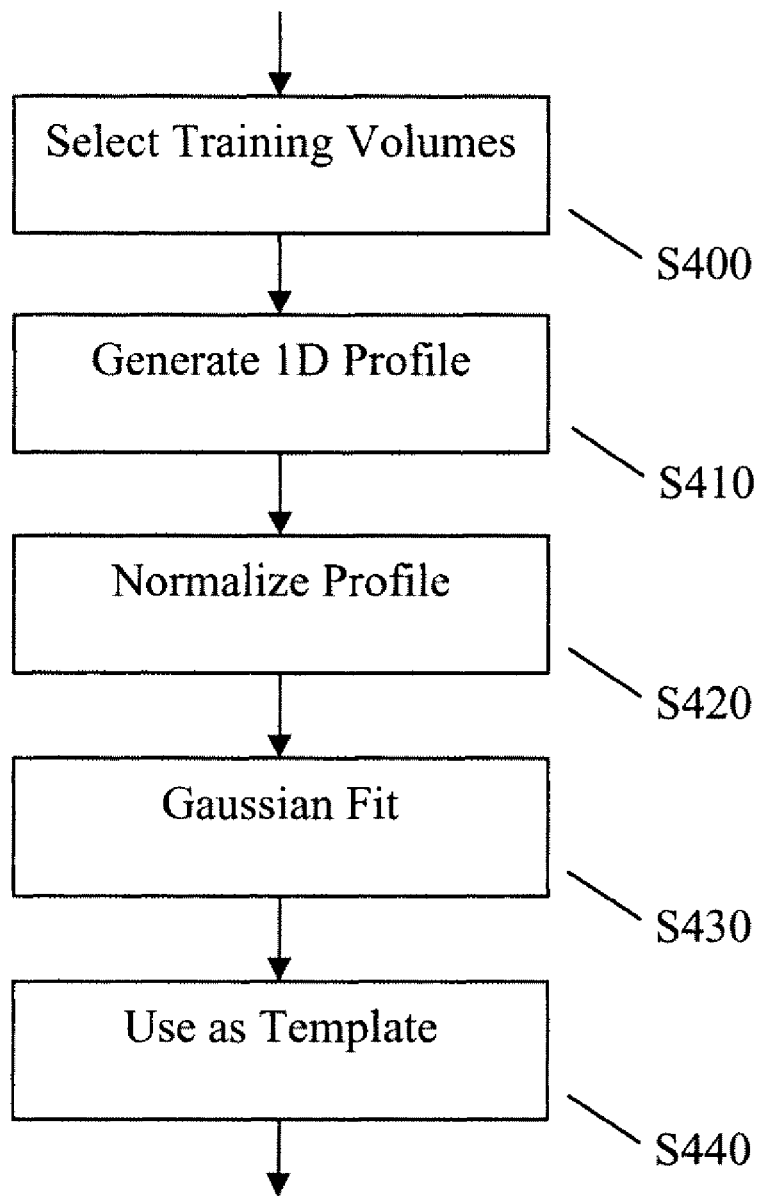
FIG. 4 shows a method for generating template profiles according to an exemplary embodiment of the present invention.

As discussed above, template profiles may be generated and used as internal structure signatures so that profiles may be compared against the template profiles to identify an internal structure. FIG. 4 shows a method for generating template profiles according to an exemplary embodiment of the present invention. First, one or more training volumes may be selected (Step S400). Training volumes are 3D medical images with identified internal structures. Profiles may then be generated from each of the training volumes, for example, using the techniques discussed above (Step S410). The profiles generated from the training volumes may then be normalized with respect to size and opacity values (Step S420). Normalized profiles are then averaged and fitted with 2nd order Gaussian exponential backgrounds (Step S430). The resulting analytical equations may then be used as templates for identification of internal structures.

Templates may be generated for each internal structure being searched for. For example, training data relating to images of lungs may be used to generate a profile template for identifying lungs while training data relating to images of colons may be used to generate a profile template for identifying colons.

Figure 5:
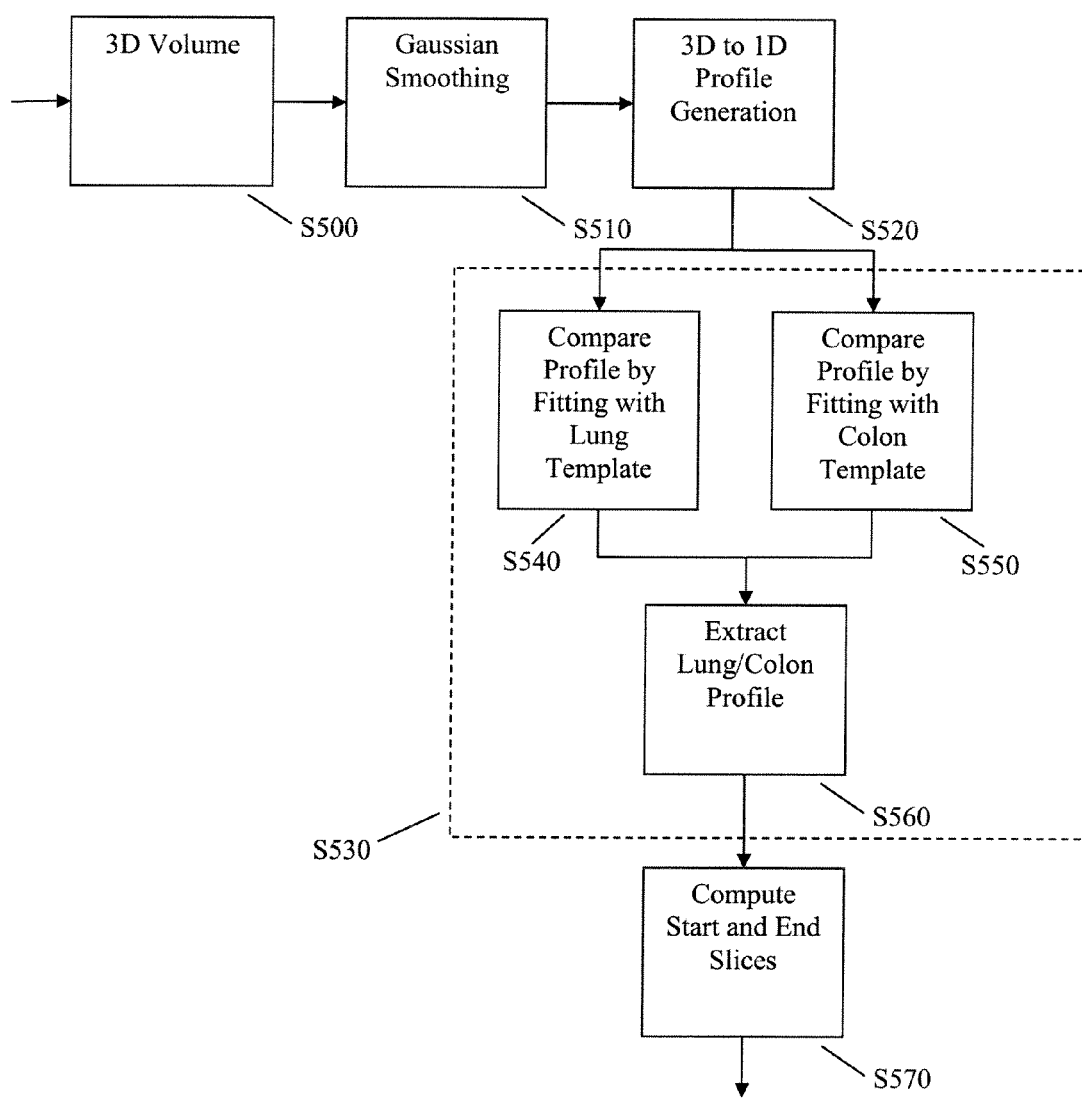
FIG. 5 illustrates a method for performing profile analysis according to an exemplary embodiment of the present invention.

After profile templates have been generated, internal structures may be identified by analyzing the profile of an unknown internal structure against the profile templates. This step may be referred to as profile analysis. FIG. 5 illustrates a method for performing profile analysis according to an exemplary embodiment of the present invention. First a 3D volume is acquired (Step S500). As discussed above, Gaussian smoothing may be performed (Step S510) and a 1D profile may be generated (Step S520). Profile analysis may then be performed according to the internal structure being searched for (Step S530). For example, if the lungs are being searched for then the profile may be compared to a lung template (Step S540). If the colon is being searched for then the profile may be compared to a colon template (Step S550). As multiple internal structures may be searched for, the profile may be compared to multiple templates. Comparing the profile to the templates include fitting the generated profile of the unknown internal structure to each of the template profiles, for example, by finding the least mean squared error value between the test profile and the template profiles, for example, a lung template profile and a colon template profile. Depending on the classification, knee points in the lung and colon profiles may be identified and lung/colon profiles may be determined (Step S560). Lung start and end positions may be identified by searching the maximum and minimum slope of the lung profile and colon start positions may identified by the zero cross over of slope from the start point and the end position by searching the minimum value from the end to knee point (Step S570).

Figure 6:
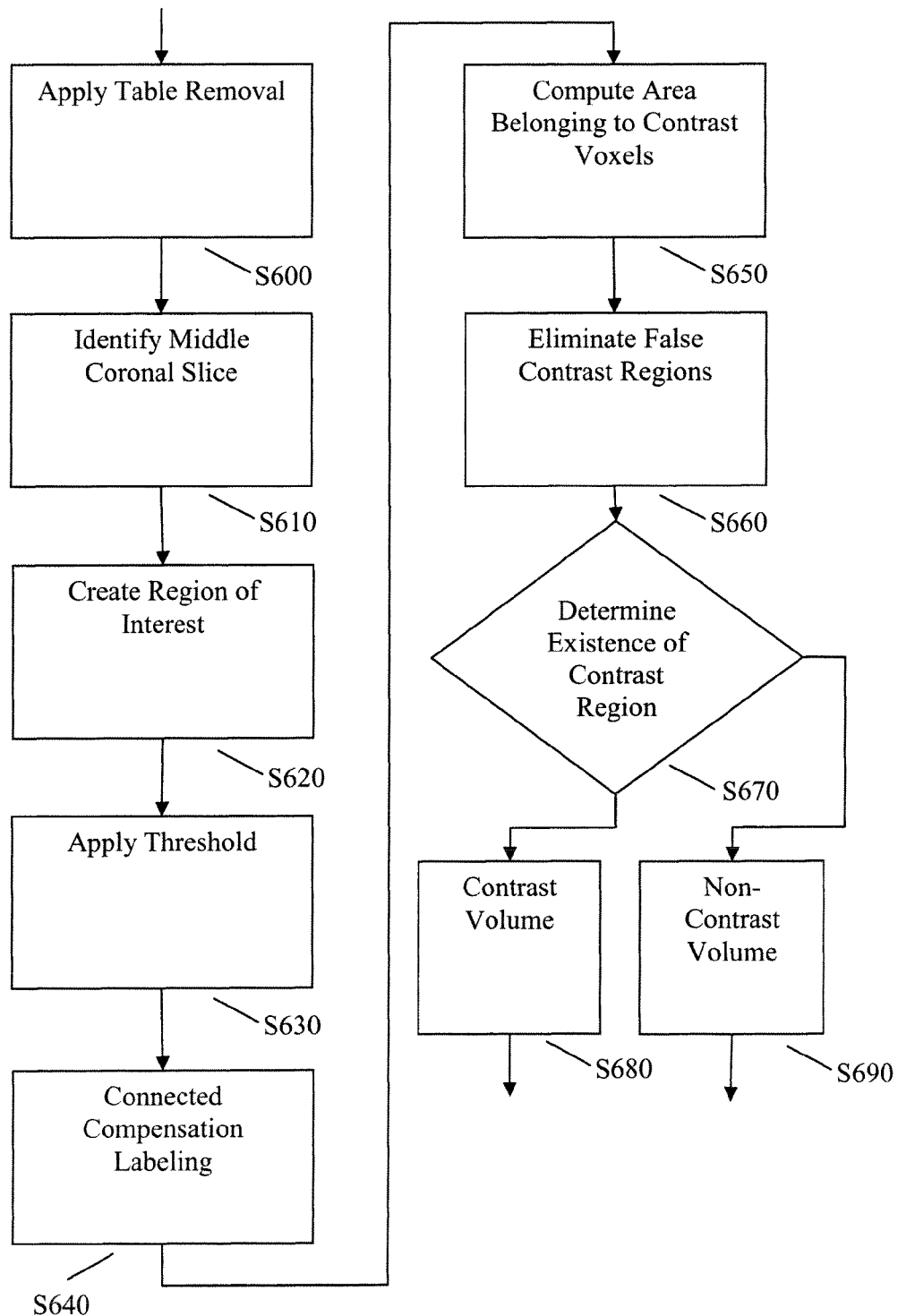
FIG. 6 shows a method for detecting contrast according to an exemplary embodiment of the present invention.

As described above, contrast detection may be performed to further enhance the speed and accuracy of CAD while minimizing user input. FIG. 6 shows a method for detecting contrast according to an exemplary embodiment of the present invention. First, table removal techniques may be applied (Step S600). Then the middle coronal slice may be identified (Step S610). The middle coronal slice is the slice spanning from the posterior to the anterior mid way between the top and bottom slice. A region of interest may then be created (Step S620) by using the body start and the body end as the left and right coordinates. The top may be defined as the 25% in row and the bottom may be defined as the 75% in row. Then, voxels with contrast may be detected by applying a threshold value, for example, using a threshold value of 1150 (Step S630). Connected component labeling may then be used to identify regions of contrast (Step S640). The area of contrast may then be computer (Step S650). The computed area of contrast may then be used as a size criteria to eliminate false contrast regions (Step S660). Finally, it may be determined whether a region of contrast exists (Step S670). If it is determined that there is no region of contrast (No, Step S670) then the volume is a non-contrast volume (Step S690). If, however, it is determined that there is a region of contrast (Yes, Step S670) then the volume is a contrast volume (Step S680).

Figure 7:
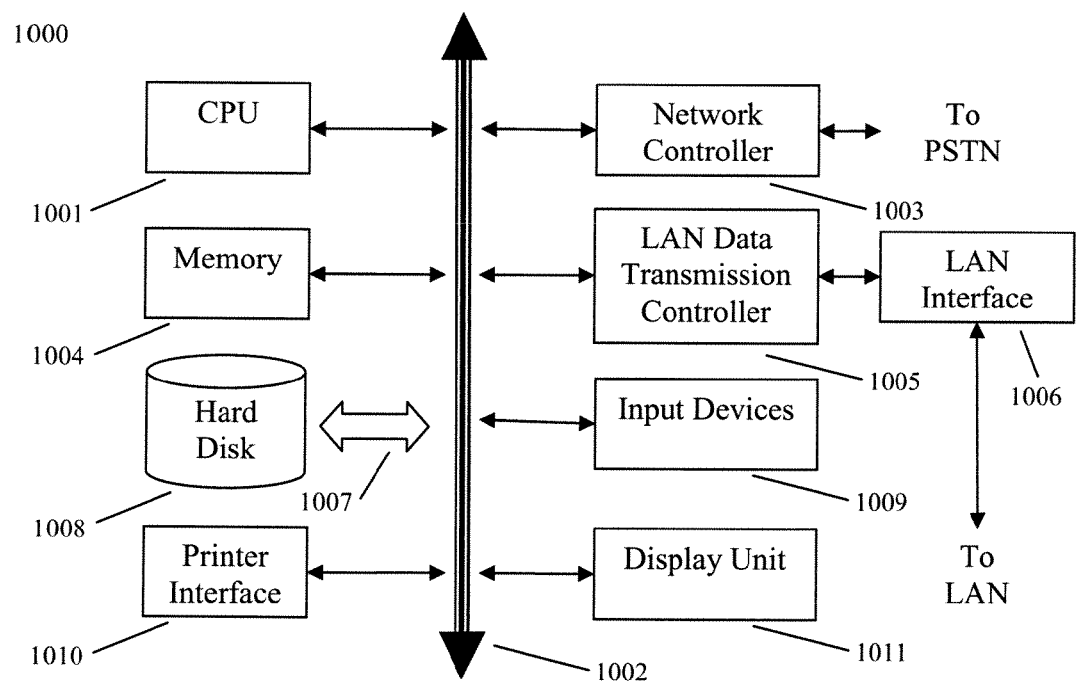
FIG. 7 shows an example of a computer system capable of implementing the method and apparatus according to embodiments of the present disclosure.

FIG. 7 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for using a medical imaging system to recognize an internal structure from a three-dimensional image comprising a plurality of image sub-volumes, the method comprising:

selecting an image sub-volume of the plurality of image sub-volumes using a binary search pattern comprising:
identifying a middle image sub-volume of the plurality of image sub-volumes and using the identified middle image sub volume as a first-selected image sub-volume;
dividing the plurality of sub-volumes into a top section and a bottom section that are separated by the middle image sub-volume;
identifying a middle image sub-volume of the top section and using the identified middle image sub volume of the top section as a second-selected image sub-volume;
identifying a middle image sub-volume of the bottom section and using the identified middle image sub volume of the bottom section as a third-selected image sub-volume; and
recursively performing the above steps of dividing and identifying to find subsequent selected image sub-volumes;

analyzing the selected image sub-volume for the presence of the internal structure;

repeating the steps of selecting an image sub-volume using the binary search pattern and analyzing the selected sub-volume for the presence of the internal structure until the internal structure is found in an image sub-volume; and identifying bounds of the internal structure based on the location of the image sub-volume within which the internal structure is found.

2. The method of claim 1, wherein the medical imaging system is a computer tomography (CT) system or a magnetic resonance imaging (MRI) system.

3. The method of claim 1, wherein the sub-volumes are image slices.

4. The method of claim 1, wherein the internal structure is a colon, a lung or a heart.

5. The method of claim 1, additionally comprising analyzing the three-dimensional image within the identified bounds of the internal structure to determine whether a contrast is present within the internal structure.

6. The method of claim 5, wherein, when it is determined that contrast is present, it is determined whether the internal structure has an elevated risk of irregularity based on the contrast.

7. The method of claim 5, wherein the step of determining whether a contrast is present within the internal structure comprises:
    identifying a middle sub-volume of the internal structure based on the identified bounds;
    identifying a region of interest within the internal structure;
    detecting voxels with contrast within the region of interest by applying a predetermined threshold;
    performing connected components labeling to define a region of contrast;
    computing an area of defined region of contrast;
    comparing an area of defined region of contrast against a minimum size criteria; and
    determining contrast is present within the internal structure when the defined area of contrast is greater than the minimum size criteria.

8. The method of claim 1, additionally comprising analyzing the three-dimensional image within the identified bounds of the internal structure to determine whether the internal structure has an elevated risk of irregularity.

9. The method of claim 8, wherein the elevated risk of irregularity is a suspected emboli or cancer.

10. The method of claim 1, wherein the step of analyzing the selected image sub-volume for the presence of the internal structure comprises:
    performing a 3D to 2D transformation on the selected image sub-volume by extracting opacity values along rays on the image sub-volume plane, processing the rays by discarding opacity values greater than a fixed value, and computing the means of all opacity values along each ray;
    generating a 1D profile on the selected image sub-volume by performing Gaussian smoothing and calculating column-wise average of the 2D transformation; and
    analyzing the 1D profile against known 1D profiles of possible internal structures to determine the presence of the internal structure within the image sub-volume.

11. A method for determining whether a contrast is present within an internal structure identified from a three-dimensional image comprising a plurality of image sub-volumes, the method comprising:
    identifying a middle sub-volume of the internal structure based on identified bounds of the internal structure, the identifying of the middle sub-volume including selecting an image sub-volume of the plurality of image sub volumes using a binary search pattern, determining whether the selected image sub-volume is the middle sub-volume of the internal structure, and repeating the selecting of the sub-volume using the binary search pattern and determining whether the selected image sub-volume is the middle sub-volume until the middle sub-volume is identified;
    identifying a region of interest within the internal structure;
    detecting voxels with contrast within the region of interest by applying a predetermined threshold;
    performing connected components labeling to define a region of contrast;
    computing area of defined region of contrast;
    comparing area of defined region of contrast against a minimum size criteria; and
    determining contrast is present within the internal structure when the defined area of contrast is greater than the minimum size criteria.

12. The method of claim 11, wherein the internal structure is a heart, lung or colon.

13. The method of claim 11, additionally comprising determining whether the internal structure has an elevated risk of irregularity based on the contrast.

14. The method of claim 11, wherein the elevated risk of irregularity is a suspected emboli or cancer.

15. A computer system comprising:
    a processor; and
    a program storage device readable by the computer system, embodying a program of instructions executable by the processor to perform method steps for recognizing an internal structure from a three-dimensional image comprising a plurality of image sub-volumes the method comprising:
    searching for an image sub-volume of the plurality of image sub-volume comprising a cross section of the internal structure using a binary search pattern to determine an order in which each of the plurality of image sub-volumes is analyzed; and
    identifying bounds of the internal structure based on the location of the image sub-volume within which the internal structure is found.

16. The computer system of claim 15, additionally comprising analyzing the three-dimensional image within the identified bounds of the internal structure to determine whether the internal structure has an elevated risk of irregularity.

17. The computer system of claim 16, additionally comprising analyzing the three-dimensional image within the identified bounds of the internal structure to determine whether a contrast is present within the internal structure.

18. The computer system of claim 16, wherein the image sub-volumes are image slices.

* * * * *